(12) United States Patent
Tapson

(10) Patent No.: US 7,584,361 B2
(45) Date of Patent: Sep. 1, 2009

(54) ENCODING AND DETECTING APPARATUS

(75) Inventor: Daniel Warren Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 855 days.

(21) Appl. No.: 11/000,315

(22) Filed: Nov. 30, 2004

(65) Prior Publication Data

US 2005/0117744 A1  Jun. 2, 2005

(30) Foreign Application Priority Data

Dec. 1, 2003  (GB)  .................................. 0327854.6

(51) Int. Cl.
*H04L 9/32* (2006.01)
*H04N 7/167* (2006.01)

(52) U.S. Cl. ............................... 713/176; 726/2; 726/3; 726/26; 726/32; 380/201; 380/262; 380/268; 713/165

(58) Field of Classification Search .................. 713/176
See application file for complete search history.

(56) References Cited

U.S. PATENT DOCUMENTS 6,037,984 A * 3/2000 Isnardi et al. .......... 375/240.21

(Continued)

FOREIGN PATENT DOCUMENTS

EP 1 324 263 7/2003

(Continued)

OTHER PUBLICATIONS

Haitsma J et al: "A watermarking scheme for digital cinema" Proceedings 2001 International Conference on Image Processing. ICIP 2001. Thessaloniki, Greece, Oct. 7-10, 2001, International Conference on Image Processing, New York, NY : IEEE, US vol. vol. 1 of 3. Conf. 8, Oct. 7, 2001, pp. 487-489, XP010563804 ISBN: 0-7803-6725-1.

*Primary Examiner*—Kambiz Zand
*Assistant Examiner*—Jenise E Jackson
(74) *Attorney, Agent, or Firm*—Oblon, Spivak, McClelland, Maier & Neustadt, P.C.

(57) ABSTRACT

According to the present invention there is provided an encoding data processing apparatus for generating a marked copy of an item of material by introducing code words into a copy of the material item. The code words are arranged to identify a data word from a set of data words having at least two fields. The apparatus comprises a code word generator operable to generate at least two code words having a plurality of code word coefficients, each of the code words being independently generated from a different code word seed, and an encoding processor operable to combine the code word coefficients with the material item. One of the code words is selected from a first set in dependence upon a value of a first of the data fields and one of the code words is selected from a second set in dependence upon a value of a second of the data fields. The values of the first data field are associated with the first set of code words and values of the second data field are associated with the second set of code words, the second set of code words being selected in dependence upon the value of the first data field. By arranging for a value of a second or subsequent data field to be selected in dependence upon a value of the first or a previous data field, then a detecting complexity for unambiguously identifying the data word can be substantially reduced.

21 Claims, 8 Drawing Sheets

U.S. PATENT DOCUMENTS 6,567,535 B2   5/2003   Rhoads
6,901,514 B1 *   5/2005   Iu et al. .................... 713/176

FOREIGN PATENT DOCUMENTS

| GB | 2 383 219 | 6/2003 |
| GB | 2 383 221 | 6/2003 |
| WO | WO 00 33282 | 6/2000 |

* cited by examiner

| 80 | 90 | 100 | | | | |
|---|---|---|---|---|---|---|
| WM1 | SEED No. | Watermarking Codeword | | | | |
| 00 | 1 | 1 | 2 | 9 | 7 | 3 |
| 01 | 2 | 0 | 0 | 1 | 5 | 6 |
| 10 | 3 | 7 | 0 | 2 | 5 | 5 |
| 11 | 4 | 9 | 3 | 2 | 1 | 6 |

| WM2 | | | | | | |
|---|---|---|---|---|---|---|
| 00 | 5 | 4 | 3 | 3 | 7 | 7 |
| 01 | 6 | 0 | 5 | 6 | 7 | 9 |
| 10 | 7 | 1 | 2 | 3 | 5 | 1 |
| 11 | 8 | 0 | 3 | 1 | 8 | 7 |

| WM1 Bits | SEED No. | Watermarking Codeword | WM2 Bits Start (120) | Bits End (130) | Seed No. (140) |
|---|---|---|---|---|---|
| 00 | 1 | 1 2 9 7 3 | 00 | 00 | 5 |
| 01 | 2 | 0 0 1 5 6 | 00 | 01 | 6 |
| 10 | 3 | 7 0 2 5 5 | 00 | 10 | 7 |
| 11 | 4 | 9 3 2 1 6 | 00 | 11 | 8 |
| | | | 01 | 00 | 9 |
| | | | 01 | 01 | 10 |
| | | | 01 | 10 | 11 |
| | | | 01 | 11 | 12 |
| | | | 10 | 00 | 13 |
| | | | 10 | 01 | 14 |
| | | | 10 | 10 | 15 |
| | | | 10 | 11 | 16 |
| | | | 11 | 00 | 17 |
| | | | 11 | 01 | 18 |
| | | | 11 | 10 | 19 |
| | | | 11 | 11 | 20 |

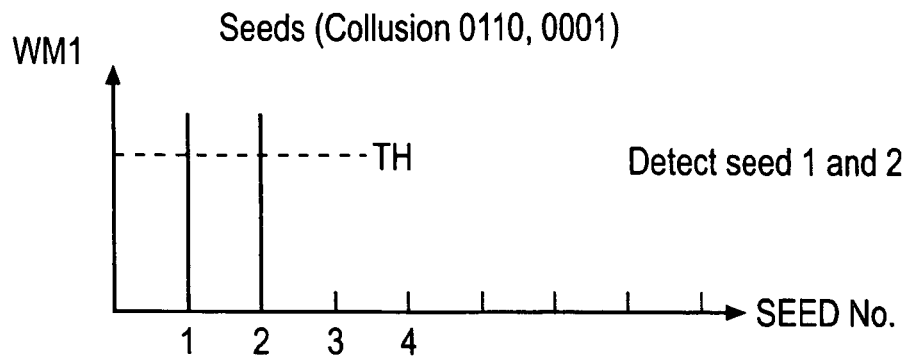
Fig. 8a
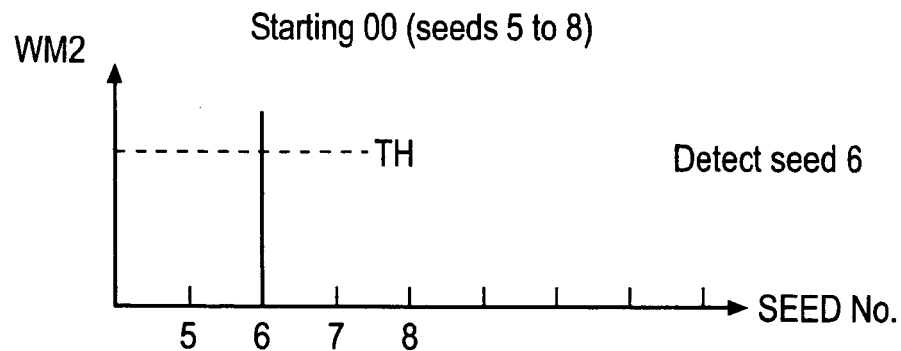
Fig. 8b
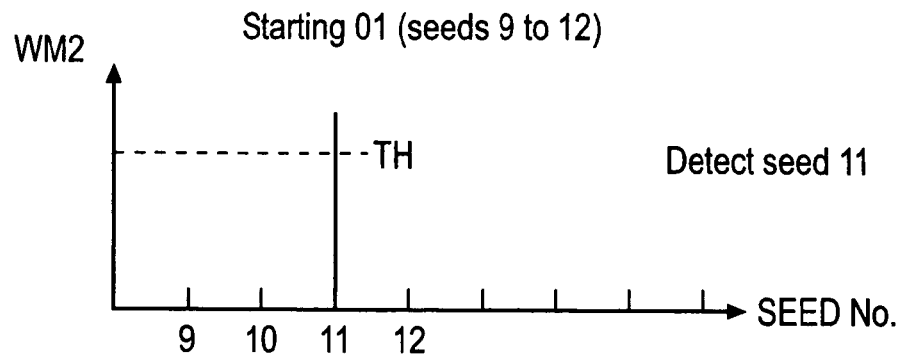
Fig. 8c
Fig. 8

ENCODING AND DETECTING APPARATUS

FIELD OF INVENTION

The present invention relates to encoding data processing apparatus and methods for generating a marked copy of an item of material by introducing code words into a copy of the material item.

Correspondingly, the present invention also relates to detecting data processing apparatus and methods operable to detect code words, which may be present in material items.

BACKGROUND OF THE INVENTION

A process in which information is embedded in material for the purpose of identifying the material is referred to as watermarking.

Code words are applied to versions of material items for the purpose of identifying the version of the material item or for conveying data represented by the code words. Watermarking can provide, therefore, a facility for identifying a recipient of a particular version of the material. As such, if the material is copied or used in a way, which is inconsistent with the wishes of the distributor of the material, the distributor can identify the material version from the code word and take appropriate action.

In co-pending European patent application 1 324 263 A, there is disclosed a watermarking system comprising an encoding data processor operable to generate at least one marked version of an original item of material by introducing one of a predetermined set of code words into a copy of the original material item. The apparatus comprises a code word generator operable to generate the code word having a plurality of code word coefficients, and an encoding processor operable to combine the code word coefficients with the material item. Each of the plurality of code words of the set is uniquely associated with a data word having first and second fields. Each of a set of values of the first field is represented as a first part of the code word having a first plurality of coefficients, and the second field is represented as a second part of the code word having a second plurality of coefficients.

The first and second fields can be assigned to different associated parameters such as for example address parameters. The first field could therefore identify the country of distribution of the material, whereas the second field could identify a particular distribution outlet within the country. A watermarking system can be formed for identifying a point of distribution of pirate copies of video material.

SUMMARY OF INVENTION

According to the present invention there is provided an encoding data processing apparatus for generating a marked copy of an item of material by introducing code words into a copy of the material item. The code words are arranged to identify a data word from a set of data words having at least two fields. The apparatus comprises a code word generator operable to generate at least two code words having a plurality of code word coefficients, each of the code words being independently generated from a different code word seed, and an encoding processor operable to combine the code word coefficients with the material item. One of the code words is selected from a first set in dependence upon a value of a first of the data fields and one of the code words is selected from a second set in dependence upon a value of a second of the data fields. Values of the first data field are associated with the first set of code words and values of the second data field are associated with the second set of code words, the second set of code words being selected in dependence upon the value of the first data field.

The known encoding and detecting data processing apparatus disclosed in European patent application 1 324 263 A, provides an arrangement for marking a material item with a code word having at least two parts to represent at least two fields of a data word. However, the values of the two parts are determined from a predetermined relationship between them. This is because a shift of a first code word representing the first data field is used to identify a seed used to form the second code word. In order to represent the values of the second data field the second code word is shifted in accordance with a value of the second data field. Thus a shift of the first watermark code word identifies a seed for generating the second code word. The shifting of the first code word allows an efficient technique for decoding which utilises a Fourier transform.

The present invention has been devised in order to provide an improvement in reducing a likelihood of a successful attack to remove or prevent detection of a watermark code word (false negative detection). This is because each of the code words used to represent a data word is generated independently from one another. This would imply an increase in detecting complexity. However, as will be explained, embodiments of the invention utilise a layered hierarchy associating a selected set of code words in dependence upon a previous data field value.

Embodiments of the present invention can be arranged to convey information in the form of data words, by arranging for each of a predetermined set of data words to be uniquely associated with code words for watermarking a material item. The code words can be combined with the material item and detected by correlating all possible code words with the material item and determining whether the code words are present in the material item from a result of the correlation. From the detected code words it is therefore possible to identify the data word conveyed by the material item. The embodiments provide a facility for identifying uniquely a data word represented by the code words or code word parts.

In the following explanation, it will be appreciated that embodiments of the present invention may be implemented by utilising two or more code words or two or more parts of the same code word, provided the parts of the code words can be distinguished and are generated independently from one another.

As will be appreciated from an explanation of example embodiments, an advantage is provided by arranging for each value of a first field of the data word to be associated with a code word, and each value of a second or subsequent data field to be represented by a code word which is selected in dependence upon the value of the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field. As such, it can be shown that the number of correlations required to identify a particular data word from a set of data words can be substantially reduced. The arrangement of the data fields in association with the watermark code words uniquely identifies a layer hierarchy of data field values, which can be used to convey different types of information.

The advantage provided by the reduction in the number of correlations can be appreciated better by analysing a number of correlations required to detect a code word representative of an n-digit data word. In order to represent uniquely an n-digit data word, having $2^n$ possible values, $2^n$ code words are required. Thus, a complexity of detection (number of correlations) increases exponentially with the number of n-bits in the data word to be conveyed. Embodiments of the present invention provide an arrangement for reducing the number of correlations which are required to unambiguously detect a data word having two or more fields from code words embedded into a material item. The reduction in the number of correlations is achieved by dividing the data words into a plurality of fields and associating a code word with each value of a first of the data fields. The first data field can thereby be used to identify a sub-set into which the data fields are divided. However, by using a second code word to identify both the value of the first data field and a value of a second data field, the order of the first and second field can be identified with a reduced number of correlations. As such, if an n-bit data word has m fields of d bits, it can be shown that the number of correlations required to detect a data word unambiguously is $m2^d$.

Various further aspects and features of the present invention are defined in the appended claims. These aspects include a detecting data processing apparatus as well as a method of encoding a material item and a method detecting a data word.

BRIEF DESCRIPTION OF THE DRAWINGS

Embodiments of the present invention will now be described by way of example only with reference to the accompanying drawings, where like parts are provided with corresponding reference numerals, and in which:

FIG. 7 is a part flow diagram, part schematic illustration of an example method of associating code words and data field values according to an embodiment of the invention;

FIG. 8a is a graphical representation of a result of detecting code words associated with a first of the data fields for the example appearing in FIG. 7, FIG. 8b is a graphical representation of a result of detecting code words associated with a second of the data fields constrained to those code words associated with a value detected for the first data field for a first data word (0001) for the example appearing in FIG. 7, and FIG. 8c is a graphical representation of a result of detecting code words associated with a second of the data fields constrained to those code words associated with a value detected for the first data field for a second data word (0110) for the example appearing in FIG. 7;

DESCRIPTION OF EXAMPLE EMBODIMENTS

Watermarking System Overview

An example embodiment of the present invention will now be described with reference to protecting video images. As will be explained, at least two code words are introduced into each copy of the video material in order to form a watermark. In alternative embodiments a single code word could be used provided the code word has unambiguously resolvable parts. Embodiments of the invention provide a technique for conveying a data word using a material item, so that the data word can be recovered by detecting watermark code words, which identify the data word. An example of an encoding image processing apparatus for introducing watermark code words into video images to convey a data word is illustrated in FIG. 1.

Video images are one example of material, which can be protected by embedding a digital code word. Other examples of material, which can be protected by embedding a code word, include software programs, digital documents, music, audio signals and any other information-bearing signal.

Figure 1:
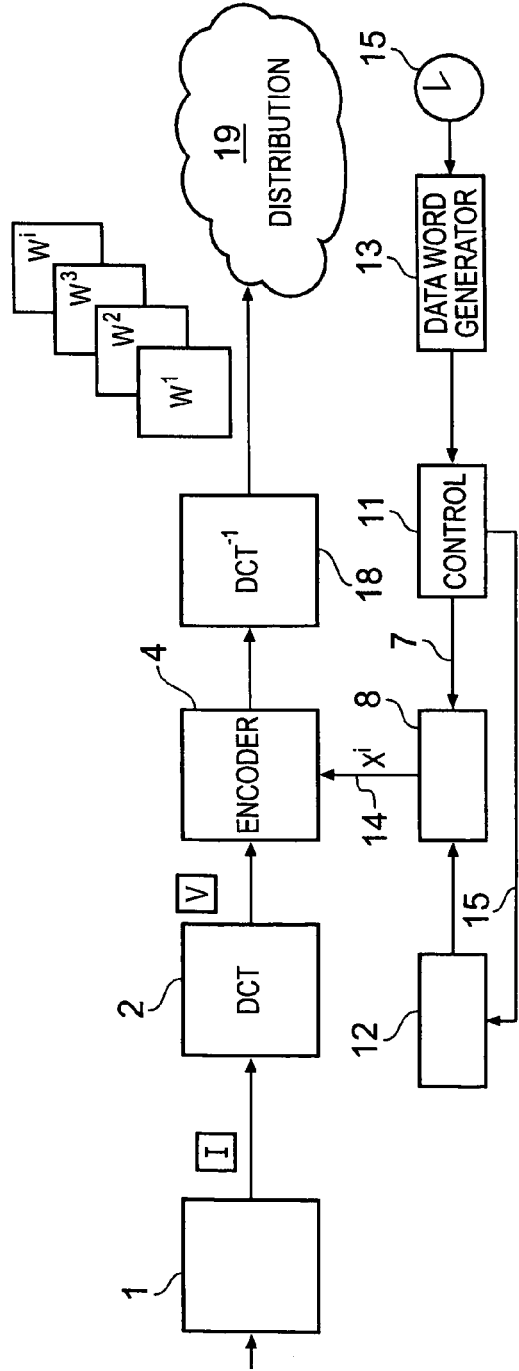
FIG. 1 is a schematic block diagram of an encoding data processing apparatus.

As shown in FIG. 1, an original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, derived from the image pixels. Therefore, where appropriate the term samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. As will be explained, the seeds are selected in order generate code words to represent particular fields of a data word. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is stored in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V=\{v_i\}=\{v_1, v_2, v_3, v_4, \ldots v_N\}$$

and $v_i$ are the DCT coefficients of the image. In other embodiments the samples of the image $v_i$ could represent samples of the image in the spatial domain or in an alternative domain.

Each of the code words $x^i$ comprises a plurality of n code word coefficients, where;

$$X^i=\{x_j^i\}=\{x_1^i, x_2^i, x_3^i, x_4^i, \ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i = V + X^i$$

$$W^i = v_1 + x_1^i, v_2 + x_2^i, v_3 + x_3^i, v_4 + x_4^i, \ldots, v_n + x_n^i$$

As shown in FIG. 1, the watermarked images $W^i$ are formed at the output of the image processing apparatus by an forming inverse DCT of the image produced at the output of the encoding processor 4 by the inverse DCT processor 18. Therefore as represented in FIG. 1 at the output of the encoder 4 a set of the watermarked images can be produced.

Association of Data Words with Watermark Code Words

As will be explained shortly, embodiments of the present invention provide a technique for conveying data within material items (for example video material as for the present example) with the effect that the data forms a watermark in that the presence of the watermark in the material is substantially imperceptible. As explained above, in order to reduce the likelihood of a watermark being detected in a material item, the watermark is formed by a vector of pseudo randomly generated coefficients and added to each of the samples of the material item (for example pixel values for video material). The pseudo random nature of the watermark coefficients has an effect that the watermark itself will appear or have characteristics, which are similar to background noise. As such, the watermark itself will be as far as possible imperceptible. However, if there is a requirement to convey specific items of data with the material for example, watermarking material to the effect of uniquely identifying that material and identifying other characteristics such as a place where the material is reproduced, then the watermark itself cannot be used to convey the data. The watermark merely represents data to, for example, the owner, since he is able to associate a data item with a watermark code word or a seed which was used to generate the code word.

Embodiments of the present invention provide a technique for associating a watermark with a data word which can then be uniquely recovered from the received watermark material in order to detect and determine the data word conveyed in the watermarked material. As will be explained, the data word is divided into a plurality of data fields each of which is associated with a watermark vector or code word. In order to represent a large data word for example up to 64 bits then $2^{64}$ code words would be possible and so in order to uniquely recover a data word representing a 64 bit value an infeasibly large number of correlations would be required at the detector. However, according to embodiments of the present invention a hierarchical or layered association of watermark code words with fields of the data word is provided with the effect that a data word of up to 64-bits can be uniquely identified from code words embedded in a watermark material item using a substantially reduced number of correlations.

Returning to FIG. 1, a control processor 11 is used to embed code words into the image material V to the effect that a data word of up to 64 bits can be represented in the watermarked material. The controller 11 controls the selection of code words in accordance with the data word to be represented. The data words are generated by a data word generator 13 which may include other apparatus to specify the fields of the data word such as a clock 15 which is used to provide a time at which the material is reproduced and watermarked by the encoder 4.

As shown in FIG. 1 the control processor 11 receives the data word to be represented in the video material and selects seeds from the seed store 12 using a selection channel 15. The seeds are then used to generate under control of the control processor 11 appropriate watermark code words in order to represent the data word provided by the data word generator 13. Each of the code words is independently generated from a different code word seed.

Figure 2:
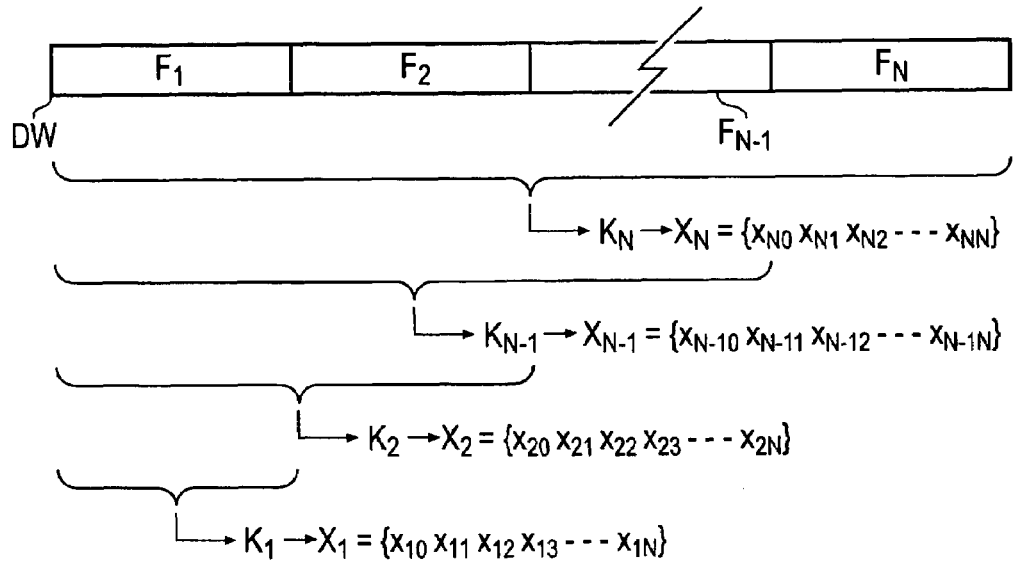
FIG. 2 is a schematic representation of an association between a data word having a plurality of fields and a plurality of watermark code words.

As shown in FIG. 2 each of the data words may have a plurality of data fields.

In FIG. 2 a data word DW is shown to include fields $F_1$, $F_2$, $F_{N-1}$, $F_N$. Each field is provided with a value, which may have significance with respect to the field with the data word. A first of the fields may then be represented by a first watermark code word $X_1$ which is generated by a seed word $K_1$. Thus the seed $K_1$ is associated and selected in accordance with the value of the first field $F_1$. The value of the second field $F_2$ is then represented by selecting a code word $K_2$ from the value in the second field $F_2$ in combination with the value in the first field $F_1$. Thus the second watermark code word $X_2$ which is added to the video material image frame is selected not only on the basis of the value of the second field $F_2$ but on the basis of the value of the first field $F_1$. In this way a hierarchy of watermark code words is generated and the detection of those code words identifies a successively increasing number of digits in the data word which the code words represent. Correspondingly, therefore the next field $F_{N-1}$ is represented by a seed $K_{N-1}$ which is used to generate uniquely a watermark $X_{N-1}$ the value of the seed $K_{N-1}$ being selected in dependence upon the value of the field $F_{N-1}$ in combination with the values of the fields $F_2$ and $F_1$. Correspondingly finally the field $X_N$ is used to select a seed word $K_N$ on the basis of the value of the field $X_N$ in combination with the values of the fields $X_{N-1}$, $F_2$ and $F_1$. Each of the fields may be used to represent a different type of information or provided with a different significance, as illustrated in FIG. 3.

Figure 3:
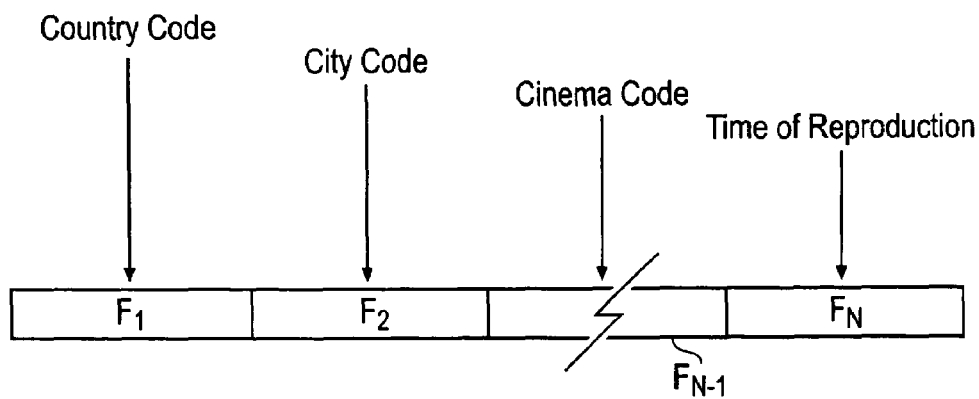
FIG. 3 is a data word having a plurality of fields each field representing a different type of information.

In FIG. 3 the first field F1 may be used to represent a country code that is to say a country where the material item for example video material is being reproduced. The second field $F_2$ may be used to represent the city where the watermark material is reproduced and the third field $F_{N-1}$ may be used to represent the cinema within the city where the material is represented. The final field $X_N$ maybe used to represent a time at which the material is reproduced.

As will be appreciated although the first field is referred to as $F_1$ and has a single watermark code word associated with each of its values the relative position of the fields within the data word DW can vary so that in fact the field $F_1$ could be in the centre or at any other position within the data word.

Layered Watermark Code Words

As explained above, the watermark code words themselves do not readily provide a facility for conveying data because these code words are generated from pseudo random numbers. Therefore, in order the uniquely represent a particular item of information such as a data word then there is required an arrangement in which the data word is associated with particular code word or code words. If the number of bits required to be represented in the data word is 64 then there are $2^{64}$ number of code words, which would be required to be represented. As such if these code words were detected by correlating the received and recovered watermark code word with all possible code words then the time required to detect a particular code word would be infeasibly large. In order to reduce the number of correlations and therefore the time required to detect a code word then the data word is divided into separate fields and each field is identified separately by a code word. However, such an identification would not provide an unambiguous identification of the data word. This will be explained with a simple example in the following paragraphs.

Figure 4:
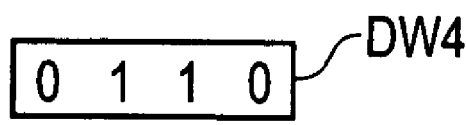
FIG. 4 is a schematic illustration of an example association between code words and data field values.

Let us assume that a data word of 4 bits is required to be represented as a watermark code word and conveyed in a material item. In FIG. 4 a 4 bit data word DW4 has 4-bits numbered 0123. For the example illustrated in FIG. 4 the data word has a value 0110. The 4-bit data word DW4 will have 16 possible values. Therefore, in order to convey this data word 16 possible watermarks would be required from a set of watermarks which could convey all possible values of the 4 bit data word. At the detector a maximum of 16 possible correlations would be required before the value within the 4 bit data word could be uniquely identified. However, as shown in FIG. 4 the data word could be divided into two 2 bit fields. The first field will have $2^2$=four possible values. Therefore, the number of code words required to represent the first field is four. Correspondingly, the number of code words required to represent the second field is four. Therefore, as illustrated in FIG. 4 the first watermark WM1 represents the four possible values illustrated in the first column 80 and each of the values of the 2-bit field is associated with a seed as shown in column 90. Using the seed a unique watermark code word is generated as shown in the third column 100. Therefore, by performing up to four correlations at the detector, the value of the first field can be uniquely identified. Correspondingly, for the second watermark WM2 to represent the value of the second field F2 corresponding seeds and code words are generated as shown for the corresponding columns 80, 90, 100.

Figure 5:
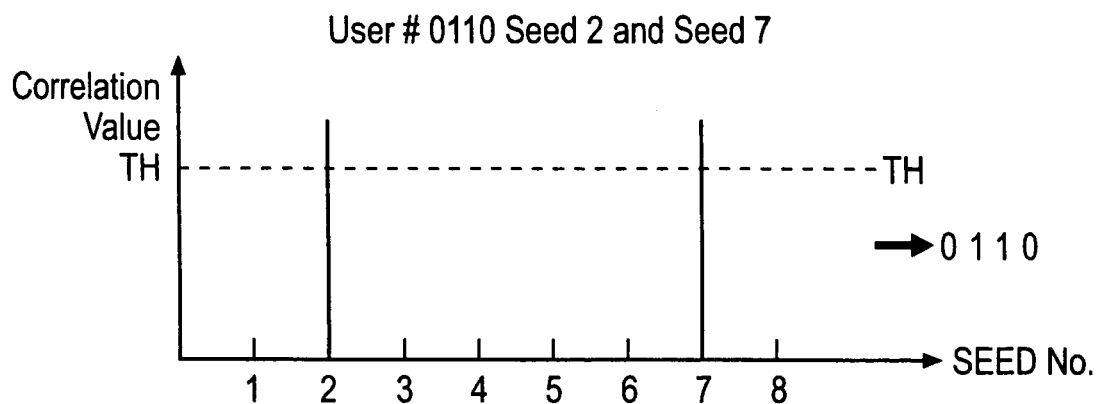
FIG. 5 is a graphical representation of a result of detecting code words for an example data word appearing in FIG. 4.

FIG. 5 illustrates a result of performing the eight correlations numbered 1 to 8 as a graphical representation. The correlation results indicate that the code words associated with seeds 2 and 7 have been recovered from the watermark material item and that therefore correspondingly the fields 01 and 10 have been correctly recovered. Thus in accordance with this arrangement instead of sixteen correlations only eight correlations are required in order to uniquely recover the values in a 4 bit data word. However, what if two or more recipients of a watermarked material item collude in order to attempt to remove the watermark code word?

Figure 6:
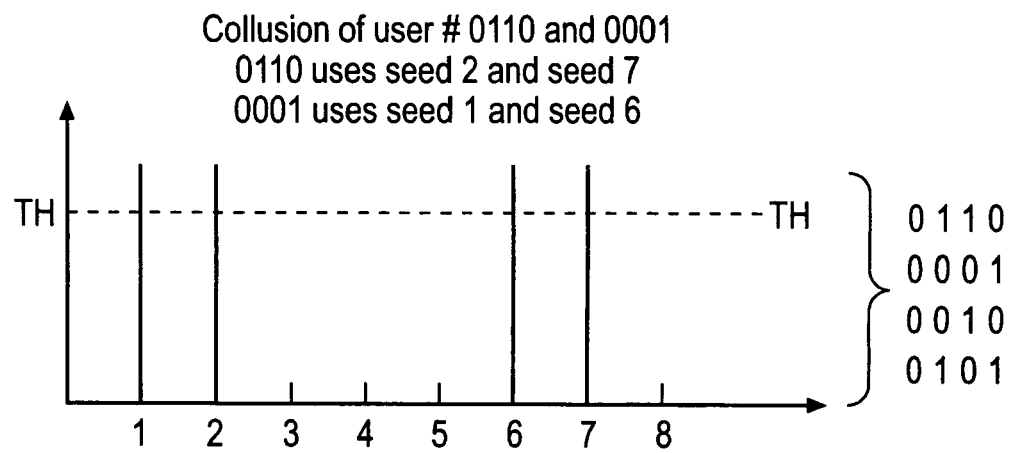
FIG. 6 is a graphical representation of a result of detecting code words from a material item which has been subject to a collusion attack for example data words appearing in FIG. 4.

FIG. 6 provides an illustration of a result of a correlation for the example shown in FIGS. 4 and 5 for the case where a data word 0110 and a data word 0001 have been represented by corresponding watermark code words in two separate items of material. If these material items are combined (for example as part of a collusion attack) then as a result of detecting the watermark code words, as before the seeds 2 and 7 will be identified for the data word 0110. Correspondingly, for the data word 0001 then seeds 1 and 6 will be identified. Accordingly, a representation of the result of correlating each of the eight possible watermark code words with a recovered version of the watermark code words would be as illustrated in FIG. 6. As illustrated in FIG. 6, the watermarks corresponding to seeds 1, 2, 7 and 6 would be detected as being present in the material item. This however does not uniquely and unambiguously identify the two data words 0110 and 0001. This is because there is an ambiguity as to the relative association of the first and second data fields. Accordingly, there are four possible data words which could correspond to the code words which have been detected which as shown in FIG. 6 are 0110, 0001, 0010 or 0101. This is because the relative association between the seeds producing the code word and the values of the first and second fields cannot be resolved from detecting the corresponding code words.

An embodiment of the present invention will now be illustrated which provides a reduction in the number of correlations required to detect a representation of a data word whilst unambiguously identifying the data word in the presence of a collusion attack.

As shown in FIG. 7 the 4-bit data word DW 4 is again divided into two fields $F_1$ and $F_2$. The first field $F_1$ is again represented by four possible code words to reflect the four possible values of the 2-bit field. However, the value in the second field is associated with the value in the first field in order to identity a seed and a corresponding code word, which is associated with both the values in the first, and the second data fields. Therefore, as illustrated in FIG. 7 for the second watermark WM2 the four possible values of the second field $F_2$ are identified with respect to the value in the first field which is associated with a corresponding code word. Thus, for the value in the first field of 00 then there are associated four possible values as shown in column 130 of the second field $F_2$. Associated with each of these values is a seed for producing a unique code word, which is then associated with a combination of the values in the first field and the second field. Correspondingly, for the particular values in the two fields illustrated in FIG. 7, the value in the first field 01 identifies a code word as generated by seed 2. However, from those values there is associated the values in the second field, all possible values for which are associated with a unique seed and therefore correspondingly a unique code word. As a result, although there is an increase in the number of seeds to twenty and correspondingly an increase in the number of possible code words, only eight correlations are still required in order to uniquely identify the values for the first and second fields. However, if there is a collusion attack between two unscrupulous users seeking to combine their watermarked material items in order to remove the watermark then will the layered arrangement of code words unambiguously identify the two users?

FIG. 8 provides an illustration of possible results of correlating a watermarked material item, which has been subject to the same collusion attack as illustrated in FIG. 6.

FIG. 8*a* illustrates a correlation result for each of the four possible codewords associated with the first field $F_1$. Accordingly, since the data words 0110 and 0001 were present in the watermarked material then the code words associated with seeds 1 and 2 will be detected because 01 and 00 were present in the data word in the first field and so the corresponding code words will be detected. Once a code word and therefore a field value for the first field has been identified then there is only a limited number of code words (4 in this example) which will then identify the value in the second field. Thus, as shown in FIG. 8*b* for the data word 0001 then a correlation with only seeds 5 to 8 is required in order to identify the value in the second field. Correspondingly, therefore the code word corresponding to seed 6 is detected which therefore indicates that the value in the second data field for the data word associated with a first of the colluding users is 01. Thus, the data word 0001 has been uniquely identified for one of the colluding users. Having detected the watermark code word corresponding to seed 2 representing the value 01 in the first field in column 120 then only four possible values associated with four possible code words can be present for the second data field illustrated in column 130. Accordingly, correlation is performed with respect to the code words generated from seeds 9 to 12 as illustrated in column 140 which detects seed 11 which as illustrated in FIG. 8c produces a high correlation value for the code word produced from seed 11. The value 10 is unambiguously detected and therefore the data word 0110 is recovered for a colluding user.

As will be appreciated, a corresponding arrangement can be provided for a 64-bit data word, which can be divided into more than two fields. As indicated above, the data fields can be provided with particular significance such as for example the country code could be the first data field. As a result, if two watermarked material items such as digital cinema productions are copied within the same country and an unscrupulous user attempts to remove a watermark by adding the two video productions together, the value in the first data field $F_1$ will be the same in both and therefore this field value will be reinforced. This is because the two illegal copies of the cinema production were acquired from the same country. Therefore, by attempting to remove the watermark by adding the two-video productions together the country code will be reinforced. This may also be true of the city code. However, if the two copies of the cinema production were acquired from different cinemas then the cinema code may be removed because the seed, and correspondingly, the watermark code word will be different for each cinema code. Since each watermark code word effectively forms pseudo random noise, combining the two video productions will serve to increase the noise and therefore remove the watermark.

Although the illustrative example is shown with first and second fields of the same size, it will be appreciated that each sub-set of possible values identified from the first field could be unevenly distributed that is to say there could be more values in one of the sub-sets than the other. As such for example, the second field could have three or four bits rather than two and the number of bits could vary between each of the sub-sets.

Detecting Processor

Figure 9:
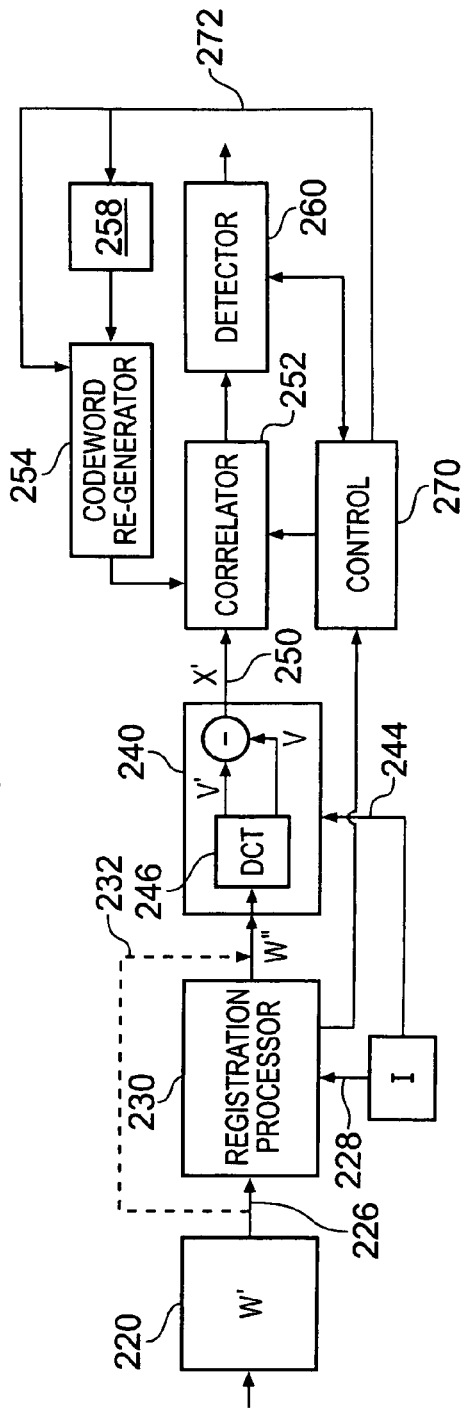
FIG. 9 is a block diagram of detecting apparatus.

A detecting apparatus which is arranged to detect code words and to recover a data word or data words, if present in the material item, is shown in FIG. 9. In FIG. 9 an offending version of the watermarked image W' is received from a source and stored in a frame store 220. Also stored in the frame store 224 is the original version of the image I, since the detection process performed by the image processor requires the original version of the image. The offending watermarked image W' and the original version of the image are then fed via connecting channels 226, 228 to a registration processor 230.

As already explained, the offending version of the image W' may have been produced by photographing or otherwise reproducing a part of the watermarked image $W^i$. As such, in order to improve the likelihood of detecting the identification code word, the registration processor 230 is arranged to substantially align the offending image with the original version of the image present in the data stores 220 and 224. More detail of a process for registering a received image with the original version of the image is provided in European patent application number 1 324 263 A. The purpose of this alignment is to provide a correspondence between the original image samples I and the corresponding samples of the watermarked image $W^i$ to which the code word coefficients have been added.

Figure 10:
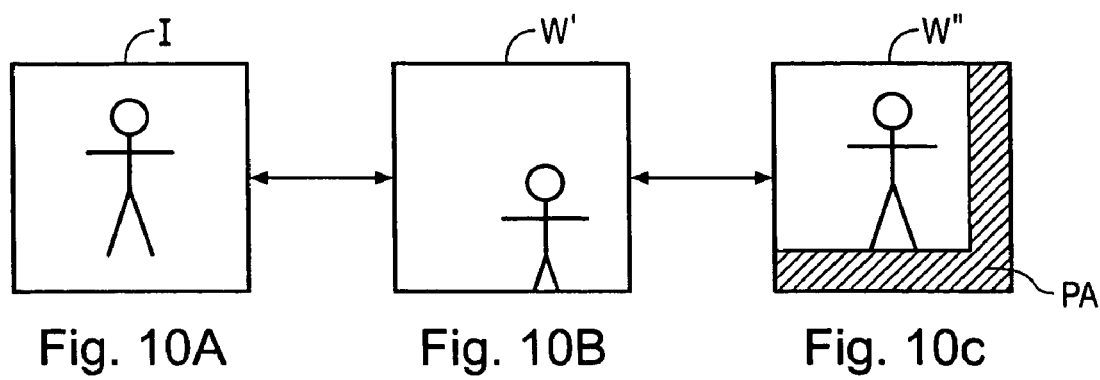
FIG. 10A is a representation of an original image.
FIG. 10B is a representation of a marked image and FIG. 10C is the marked image after registration.

The effects of the registration are illustrated in FIG. 10. In FIG. 10 an example of the original image I is shown (FIG. 10A) with respect to an offending marked version of the image W' (FIG. 10B). As illustrated in FIG. 10C, the watermarked image W' is offset with respect to the original image I as a result of registration, in order to recover a representation of the code word coefficients, the correct samples of the original image should be subtracted from the corresponding samples of the marked offending image. To this end, the two images are aligned. As shown in FIG. 10, the registered image W'' has a peripheral area PA which includes parts which were not present in the original image.

As will be appreciated in other embodiments, the registration processor 230 may not be used because the offending image W' may be already substantially aligned to the originally version of the image I, such as, for example, if the offending version was downloaded via the Internet. Accordingly, the detecting image processor is provided with an alternative channel 232, which communicates the marked image directly to the recovery processor 240.

The registered image W'' is received by a recovery processor 240. The recovery processor 240 also receives a copy of the original image I via a second channel 244. The registered image W'' and the original image I are transformed by a DCT transform processor 246 into the DCT domain. An estimated code word X' is then formed by subtracting the samples of the DCT domain marked image V' from the DCT domain samples of the original image V as expressed by the following equations:

$$X' = V' - V$$
$$= v'_1 - v_1, v'_2 - v_2, v'_3 - v_3, v'_4 - v_4, \ldots, v'_n - v_n,$$
$$= x'_1, x'_2, x'_3, x'_4, \ldots x'_n$$

The output of the recovery processor 240 therefore provides on a connecting channel 250 an estimate of the coefficients of the code word which is to be identified. The recovered code word X' is then fed to a first input of a correlator 252. The correlator 252 also receives on a second input the regenerated code words $X^i$ produced by the code word generator 254. The code word generator 254 operates to reproduce code words under the control of a control processor 270. The control processor 270 controls the code word re-generator 254 and the data store 258, which stores the seeds for generating the watermark code words. The control processor 270 selects the code words to be generated and controls the correlator 252 in accordance a result of previously detected code words and associated data field values. The generation of code words is selected and controlled to the effect that if a higher layer code word has been detected, then only code words and corresponding correlations are performed for the limited set of code words associated with the next field value. As explained above, the code words associated with a higher field effectively divide the possible values of the data word into sets. Accordingly, if one value for a set has been identified, then only code words are generated and correlations performed for corresponding field values within the sub-set.

Figure 11:
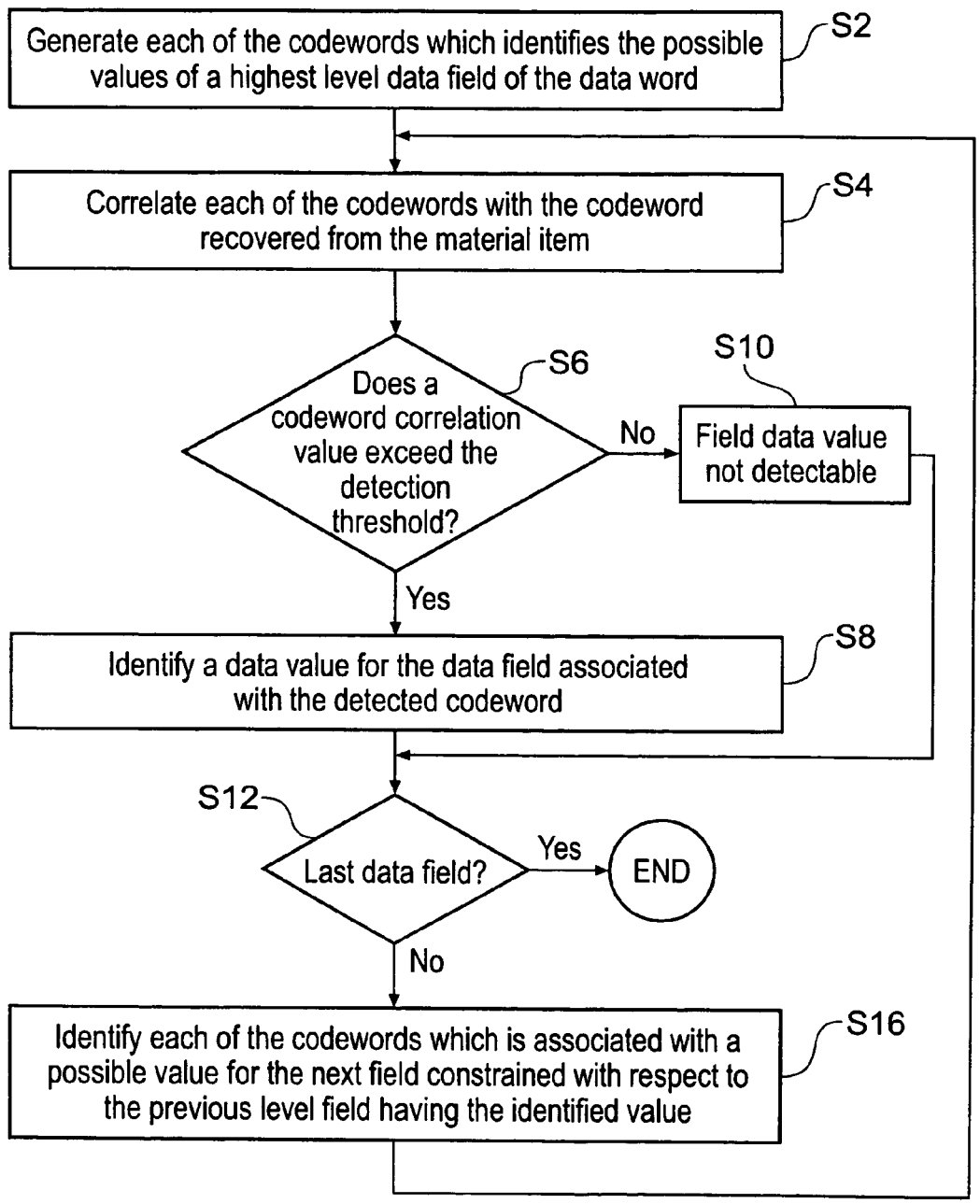
FIG. 11 is a flow diagram of a process for detecting a data word according to an embodiment of the invention.

The operation of the control processor 270 is illustrated by the flow diagram shown in FIG. 11. The flow diagram of FIG. 11 is summarised as follows:

S2: Starting with a highest level data field in the data word, the control processor arranges for the code word re-generator 254 to generate a code word associated with each of a corresponding value of the first data field.

S4: The control processor then arranges for the correlator 252 to correlate each of the re-generated code words with an estimation of the code word recovered from the material item (video image according to the current example).

S6: According to the correlation and detection process, which will be explained in more detail shortly, the correlator 252 generates a correlation value for each correlation of the recovered code word with a re-generated code word. The correlation values are received by a detector 260. If a correlation value exceeds a detection threshold, then the detector determines that the code word was present in the recovered code word. One or more than one code word may be determined as being present.

S8: If a correlation value exceeds the detection threshold, then a data value for the particular field is identified by association with the detected code word. For the example illustrated in FIG. 7, the detection of the first data field, will be the value in the first two-bit field, which is 01.

S10: If no correlation value exceeds the detection threshold then it is determined that no data field value is detectable for that field. However, a code word associated with a lower hierarchy may be detectable.

S12: The control processor determines from knowledge of the structure of the data word, provided by the data store 258 whether there is a further field to be evaluated. The structure of the data word defines the number and the size of the data fields. The form of the structure is pre-stored in the data store 258.

S14: If the last field has been evaluated then processing ends.

S16: Each of the code words associated with a possible value of the next field, constrained with respect to the data field value detected for the previous data field are identified. For the example illustrated in FIG. 7, the code words are limited to those generated by code words 9 to 12. These code words are reproduced by the code word re-generator 254 from the identified seeds. Processing then loops around to step S4.

In some examples, more than one data word may be present in the watermarked material item, as a result for example of an attempt to remove the water mark by combining two or more different copies of marked media items. The detecting data processing apparatus may be arranged therefore to detect each of the data words. To this end, the control processor 270 may be arranged to control the code word re-generator to re-generate selectively each code word associated with a possible value of the first data field of each data word. The re-generated code words are then correlated with the recovered code word and to identify from a result of the correlations, a value of the first field for each of the plurality of data words. Then, for each of the plurality of data words, each code word associated with a possible value of the second data field is re-generated, the code words being selected in dependence upon the value of the first data field for each of the data words. The re-generated code words are then correlated with the recovered code word, and a value of the second field for each of the data words is identified from a result of the correlations.

Detection of a Codeword

The correlator 252 forms n similarity sim(i) values. In one embodiment, the similarity value is produced by forming a correlation in accordance with following equation:

$$\text{sim}(i) = \frac{X^i \cdot X'}{\sqrt{X^i \cdot X'}} = \frac{x_1^i \cdot x_1' + x_2^i \cdot x_2' + x_3^i \cdot x_3' + \ldots + x_n^i \cdot x_n'}{\sqrt{x_1^i \cdot x_1' + x_2^i \cdot x_2' + x_3^i \cdot x_3' + \ldots + x_n^i \cdot x'}}$$

Figure 12:
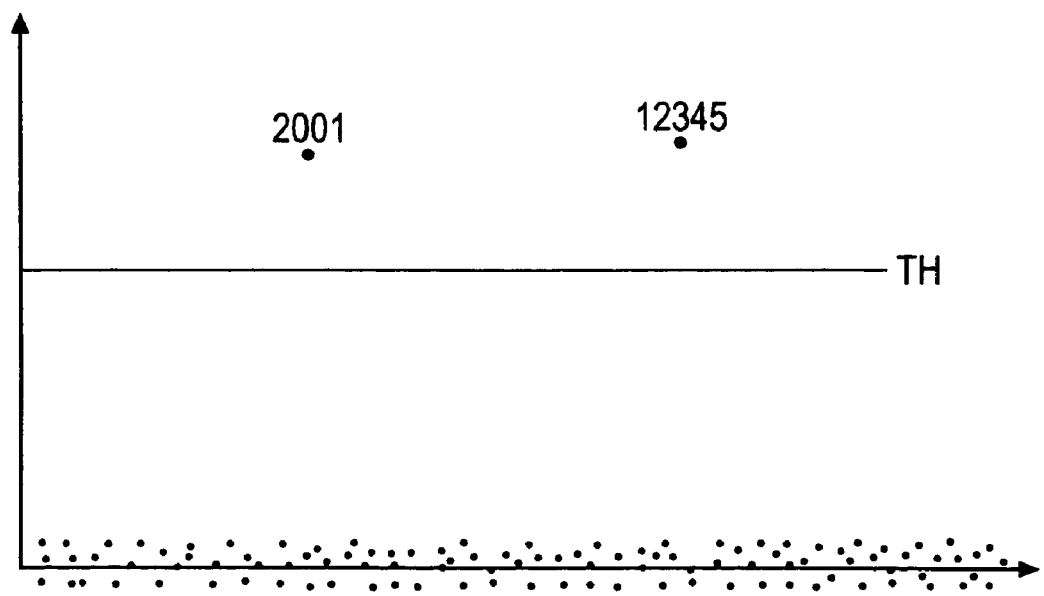
FIG. 12 is a graphical representation of an example correlation result for each of a set of code words N.

Each of the n similarity values sim(i) is then fed to a detector 260. The detector 260 then analyses the similarity values sim(i) produced for each of the n possible code words. As an example, the similarity values produced by the correlator 252 are shown in FIG. 12 with respect to a threshold TH for each of the possible code words. As shown in FIG. 12, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size and the watermarking strength α, the height of the threshold TH can be set in order to guarantee the false detection probability. As in the example in FIG. 13, if the similarity values produced by the correlator 252 exceed the threshold then, with this false positive probability, the recipients of the marked image are considered to have colluded to form the offending watermarked version of the image $W^i$.

Other Applications

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite or other broadcast channel. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable encoded a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is:

1. An apparatus for generating a marked copy of an item of material by introducing code words into a copy of the item, the code words being arranged to uniquely identify a data word from a predetermined set of data words each of the data words having at least two fields, the apparatus comprising:
means for generating at least two of the code words having a plurality of code word coefficients, each of the at least two of the code words being independently generated from a different code word seed, one of the at least two of the code words being selected from a first set in a dependence upon a value of a first of the at least two fields and another one of the at least two code words being selected from a second set in a dependence upon a value of a second of the at least two fields, values of the first of the at least two fields being associated with the first set and values of the second of the at least two fields being associated with the second set, the second set being selected in a dependence upon the value of the first of the at least two fields, and
means for combining the plurality of code word coefficients with the item.

2. An apparatus for determining a data word represented by a plurality of code words recovered from a marked material item, the data word including at least two fields, a first of the plurality of code words being associated with a value of a first of the at least two fields and a second of the plurality of code words being associated with a value of a second of the at least two fields in a dependence upon the value of the first of the at least two fields, the apparatus comprising:
means for re-generating selectively each first code word of the plurality of code words associated with a possible value of the first of the at least two fields;
means for arranging for re-generated first code words to be correlated with the recovered code words in a first correlation, each of the first code words being independently generated from a different code word seed;
means for identifying from a result of the first correlation, the value of the first of the at least two fields:
means for re-generating selectively each second code word of the plurality of code words associated with a possible value of the second of the at least two fields, and selected in a dependence upon the value of the first of the at least two fields;
means for arranging for re-generated second code words to be correlated with the recovered code words in a second correlation; and
means for identifying from a result of the second correlation, the value of the second field of the at least two fields.

3. An encoding data processing apparatus for generating a marked copy of an item of material by introducing code words into a copy of the item, the code words being arranged to identify a data word from a set of data words having at least two fields, the apparatus comprising;
a code word generator operable to generate at least two of the code words having a plurality of code word coefficients, each of the at least two of the code words being independently generated from a different code word seed, one of the at least two of the code words being selected from a first set in a dependence upon a value of a first of the at least two fields and another one of the at least two code words being selected from a second set in a dependence upon a value of a second of the at least two fields; and
an encoding processor operable to combine the plurality of code word coefficients with the item, wherein values of the first of the at least two fields are associated with the first set and values of the second of the at least two fields are associated with the second set, the second set being selected in a dependence upon the value of the first of the at least two fields.

4. The encoding data processing apparatus as claimed in claim 3, wherein the data words are divided into sub-sets, the value of the first of the at least two fields of each of the data words identifying one of the sub-sets, the second set being associated with the values of the second of the at least two fields of the data words within the sub-sets.

5. The encoding data processing apparatus as claimed in claim 4, wherein the sub-sets contain different numbers of the data words from the set.

6. The encoding data processing apparatus as claimed in claim 4, wherein a length of the second of the at least two fields is not equal between two of the sub-sets.

7. The encoding data processing apparatus as claimed in claim 3, wherein,
the values of the first of the at least two fields are uniquely associated with seeds for generating the first set, and
the values of the first of the at least two fields in combination with the values of the second of the at least two fields are uniquely associated wit seeds for generating the second set.

8. The encoding data processing apparatus as claimed in claim 7, wherein,
the code words are generated from pseudo-random numbers, and
the data words are formed from digits.

9. The encoding data processing apparatus as claimed in claim 3, wherein each of the at least two fields conveys different types of information.

10. The encoding data processing apparatus as claimed in claim 9, wherein one of the at least two fields represents a geographical location.

11. The encoding data processing apparatus as claimed in claim 9, wherein one of the at least two fields represents a time of encoding the item.

12. A cinema projector including the encoding data processing apparatus according to claim 3, wherein,
the encoding data processing apparatus is operable to receive at least one of audio signals and image signals before a reproduction, and
the encoding data processing apparatus is operable to introduce the code words into the at least one of the audio signals and the image signals before the reproduction.

13. A web server operable to provide material items for downloading via the Internet, the web server including the encoding data processing apparatus according to claim 3, wherein,
the encoding data processing apparatus is operable to receive the material items, and
the encoding data processing apparatus is operable to introduce a code word into the material items before the material items are downloaded.

14. A method, for an encoding apparatus of generating a marked copy of an item of material by introducing code words into a copy of the item, the code words being arranged to uniquely identify a data word from a predetermined set of data words each of the data words having at least two fields, the method comprising;
generating, with the encoding apparatus, at least two of the code words having a plurality of code word coefficients, each of the at least two of the code words being independently generated from a different code word seed, one of the at least two of the code words being selected from a first set in a dependence upon a value of a first of the at least two fields and another one of the at least two code words being selected from a second set in a dependence upon a value of a second of the at least two fields, values of the first of the at least two fields being associated with the first set and values of the second of the at least two fields being associated with the second set, the second set being selected in a dependence upon the value of the first of the at least two fields, and
combining, with the encoding apparatus, the plurality of code word coefficients with the item.

15. A storage medium providing program code that, when executed by a processor causes the processor to carry out The method according to claim 14.

16. A method, for a code word detecting apparatus, of determining a data word represented by a plurality of code words recovered from a marked material item, the data word including at least two fields, a first of the plurality of code words being associated with a value of a first of the at least two fields and a second of the plurality of code words being associated with a value of a second of the at least two fields in a dependence upon the value of the first of the at least two fields, the method comprising:

re-generating, with the code word detecting apparatus, selectively each first code word of the plurality of code words associated with a possible value of the first of the at least two fields;
arranging, with the code word detecting apparatus, for re-generated first code words to be correlated with the recovered code words in a first correlation, each of the first code words being independently generated from a different code word seed;
identifying, with the code word detecting apparatus, from a result of the first correlation, the value of the first of the at least two fields;
re-generating, with the code word detecting apparatus, selectively each second code word of the plurality of code words associated with a possible value of the second of the at least two fields and selected in a dependence upon the value of the first of the at least two fields;
arranging, with the code word detecting apparatus, re-generated second code words to be correlated with the recovered code words in a second correlation; and
identifying, with the code word detecting apparatus, from a result of the second correlation, the value of the second of the at least two fields.

17. A detecting data processing apparatus operable to determine at least one data word from code words recovered from a marked material item, the at least one data word including at least two fields, values of a first of the at least two fields being associated with a first set of code words, values of a second of the at least two fields being associated wit a second set of code words, the second set of code words being selected in a dependence upon a value of the first of the at least two fields, the detecting apparatus comprising:
a code word re-generator operable to re-generate code words each having a plurality of code word coefficients and being independently generated from a different code word seed;
a correlator operable to correlate the re-generated code words with the recovered code words; and
a control processor operable to control the code word re-generator to re-generate selectively each first code word associated with a possible value of the first of the at least two fields, to arrange for re-generated first code words to be correlated with the recovered code words in a first correlation, to identify, from a result of the first correlation, the value of the first of the at least two fields, to re-generate selectively each second code word associated with a possible value of the second of the at least two fields and selected in a dependence upon the value of the first of the at least two fields, to arrange for re-generated second code words to be correlated with the recovered code words in a second correlation, and to identify, from a result of the second correlation, a value of the second of the at least two fields.

18. The detecting data processing apparatus as claimed in claim 17, wherein, for each subsequent field of the at least two fields in the at least one data word, the control processor is operable to re-generate selectively each subsequent code word associated with a possible value of a respective subsequent field, and selected in a dependence upon values of the at least two fields already identified, to arrange for re-generated subsequent code words to be correlated with the recovered code words in a subsequent correlation, and to identify from a result of the subsequent correlation, a value of the respective subsequent field.

19. The detecting data processing apparatus as claimed in claim 17, wherein each of the code words is generated from a seed, seeds for each possible code word of the code words being stored in a data store, the code word re-generator being arranged to generate the code words in accordance with keys, the plurality of code word coefficients being pseudo-random numbers.

20. The detecting data processing apparatus as claimed in claim 19, wherein information representing a structure of the at least one data word is stored in the data store for access by the control processor, the structure providing a number of the at least two fields in the at least one data word and a number of digits in each of the at least two fields.

21. The detecting data processing apparatus as claimed in claim 17, wherein the detecting data processing apparatus is operable to detect more than one of the at least one data word from the code words recovered from the marked material item, the control processor being operable to control the code word re-generator to re-generate selectively each first code word associated with a possible value of the first of the at least two fields of each of the at least one data word, to arrange for the respective re-generated first code word to be correlated wit one of the recovered code words in a respective first correlation, to identify from a result of respective first correlation, a value of the respective first of the at least two fields for each of the at least one data word, to re-generate selectively, for each of the at least one data word, each second code word associated with a possible value of the second of the at least two fields and selected in a dependence upon the respective value of the first of the at least two fields for each of the at least one data word, to arrange for the respective re-generated second code word to be correlated with the one of the recovered code words in a respective second correlation, and to identify from a result of the respective second correlation, a value of the respective second of the at least two fields for each of the at least one data word.

* * * * *